United States Patent
Baader et al.

Patent Number: 5,303,128
Date of Patent: Apr. 12, 1994

[54] DOME LIGHT HOUSING

[76] Inventors: Joseph E. Baader, 333 Holiday Dr., Springfield, Ohio 45505; Edward J. Baader, 232 Stephen La., Springfield, Ohio 45505

[21] Appl. No.: 902,202

[22] Filed: Jun. 22, 1992

Related U.S. Application Data

[63] Continuation-in-part of Ser. No. 772,818, Oct. 8, 1991, abandoned.

[51] Int. Cl.⁵ ............................................. B60G 3/02
[52] U.S. Cl. ........................................ 362/80; 362/74; 362/310
[58] Field of Search ................. 362/61, 74, 80, 83.3, 362/310, 365, 368, 369

[56] References Cited

U.S. PATENT DOCUMENTS 2,091,490  8/1937  Prance .................................. 362/253
2,957,073 10/1960  Legge .................................... 362/80

FOREIGN PATENT DOCUMENTS 1245772  7/1967  Fed. Rep. of Germany .

Primary Examiner—Ira S. Lazarus
Assistant Examiner—Y. Quach
Attorney, Agent, or Firm—David H. Semmes

[57] ABSTRACT

A dome light housing of the type adapted for fitting within a school bus interior. The housing includes a base defining a well having an enclosed bottom, an enclosed end and an end with aperture, together with an open top. A peripheral ledge and support surface extends around the top of the well, as a seat for a covering lens. A seat for a plug insert is defined at the open end of the well. A covering lens is removably supported upon the support surface within the peripheral ledge and a plug insert is fitted within the end with aperture, so as to support an illuminating bulb and wiring assembly within the well and adjacent the covering lens.

3 Claims, 4 Drawing Sheets

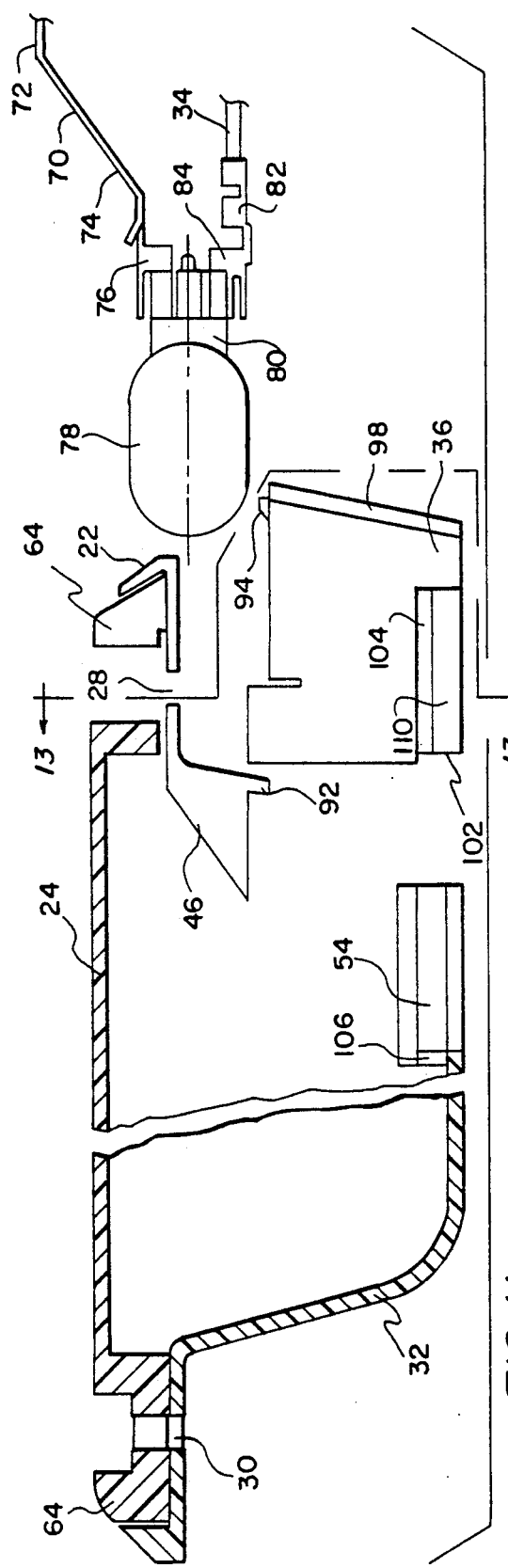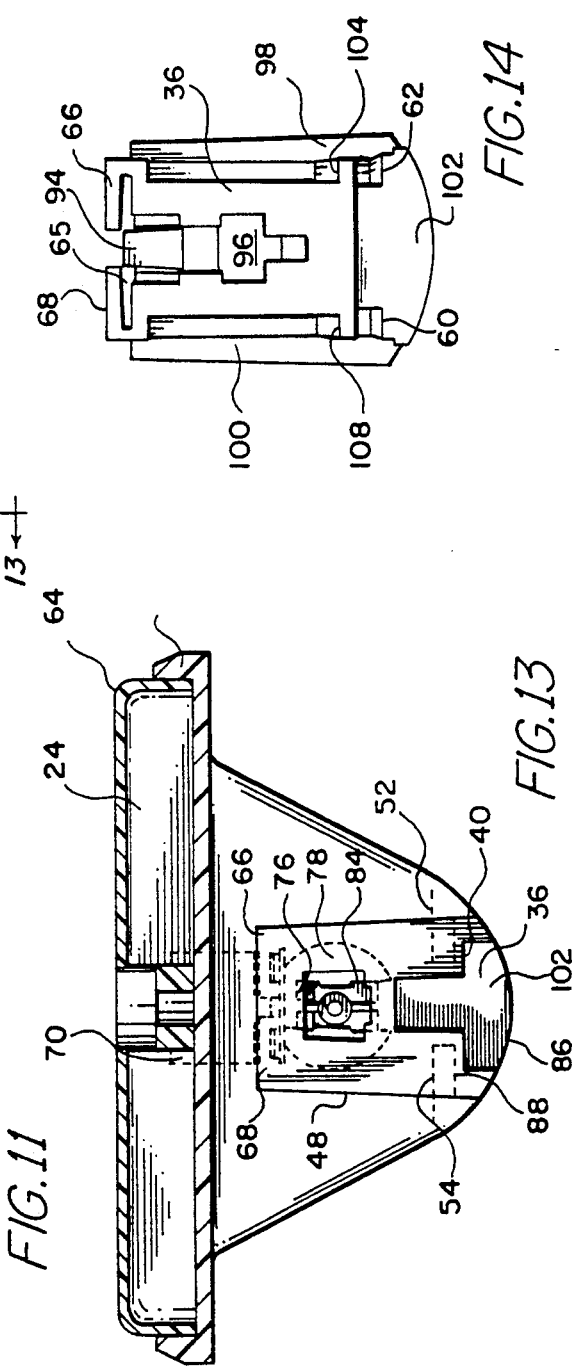

DOME LIGHT HOUSING

CROSS-REFERENCES TO RELATED APPLICATIONS

A continuation-in-part of applicants' earlier filed DOME LIGHT HOUSING (Ser. No. 07/772,818), filed Oct. 8, 1991, and now abandoned.

BACKGROUND OF THE INVENTION

1. Field of the Invention

Dome lights of the type adapted for fitting within the ceiling of a vehicle, such as school buses, trucks, and the like.

2. Description of the Prior Art

| DASHNER | 2,116,750 |
| McCAIN | 3,671,739 |
| KAMINSKI et al. | 4,628,417 |
| DYKSTRA et al. | 4,686,609 |
| PENG | 4,760,500 |

The aforelisted patents suggest various dome light configurations. However, none suggest a tamper-proof dome light which is readily installed and grounded within the ceiling of a school bus.

SUMMARY OF THE INVENTION

According to the present invention, there is provided a dome light housing which is simply constructed, is readily installed in a school bus ceiling and is tamper-proof from the hands of the school children passengers.

A unitary dome light housing is provided for supporting both a bulb assembly and a covering lens. The housing includes a base defining a well having an enclosed bottom, an enclosed end, an end with aperture and an open top; a peripheral ledge and support surface extending around the open top of the well as a seat for a covering lens and a seat for a plug insert is defined at one enclosed end of the well. A covering lens is removably supported upon the peripheral ledge and support surface. A plug insert is fitted within the end with aperture, so as to support an illuminating bulb and wiring assembly within the well and adjacent the lens.

DESCRIPTION OF THE DRAWINGS

FIG. 5 is a front elevation of covering lens 24 prior to fitting into the housing and prior to conventional attachment at each end by means of set screws or the like.

FIG. 11 is an exploded, fragmentary schematic partially in longitudinal section and showing positioning of the plug insert 36 prior to insertion within the housing and the resilient clip 70 for supporting illuminating bulb 78 and wiring assembly connector 34.

FIG. 13 is an end elevation of the plug insert supported within the seat with illuminating bulb 78 and wiring assembly 34 supported upon resilient clip 70.

FIG. 14 is an end elevation of the plug insert.

DESCRIPTION OF THE PREFERRED EMBODIMENTS

Figure 1:
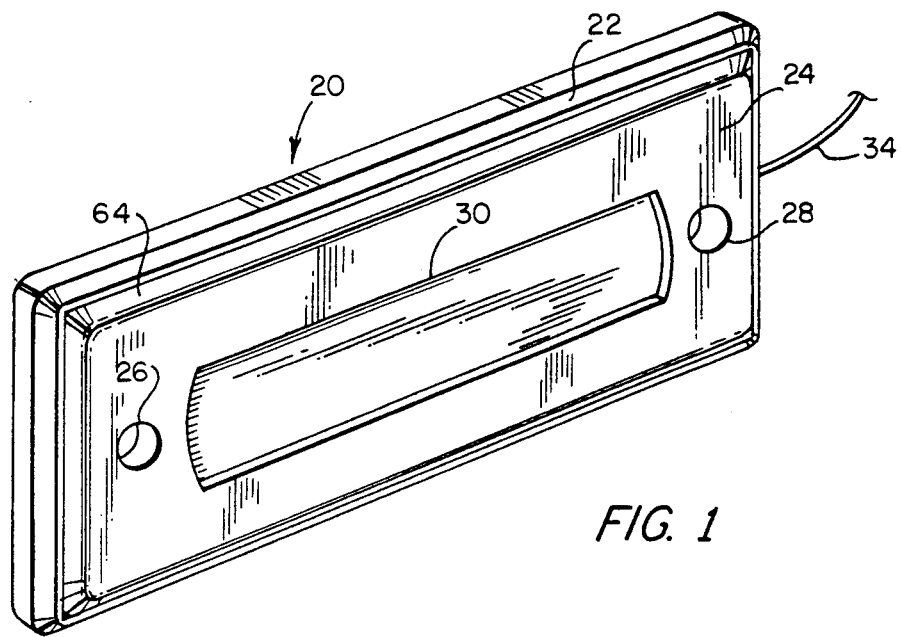
FIG. 1 is a perspective view of the dome light housing with covering lens.
Figure 2:
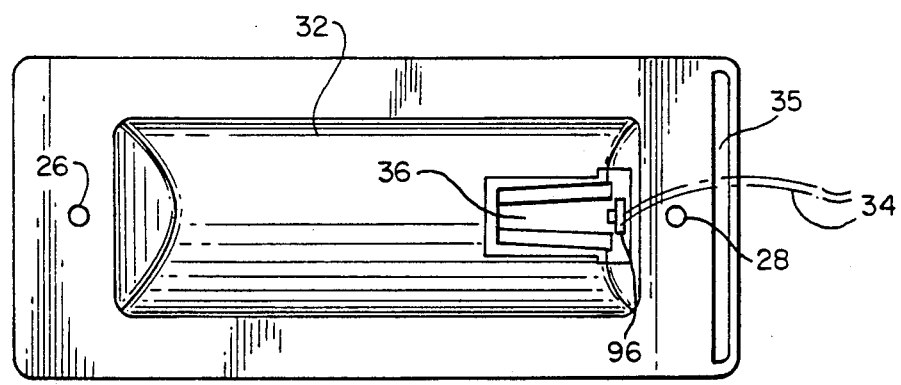
FIG. 2 is a rear elevation.

In FIGS. 1 and 2, dome light housing 20 is indicated as having a peripheral ledge 22 extending around top supporting surface 25 of curvate well 32.

Covering lens 24, including a central recessed area 30, rounded exterior edge 64 and bearing a commercial legend, for example: "XYZ Corporation" may be secured to the housing by means of set screws or the like, fitted within apertures 26, 28. Covering lens 24 may be dimensioned so as to be snap-fitted within housing peripheral ledge 22 in abutment with supporting surface 25.

In FIG. 2, well 32 is shown with plug insert 36 extending therein as a support for electrical wire connector 82 with wiring assembly 34 extending outwardly of housing 20. An open slot 35 may be defined at one end of the supporting surface 25 as an assistance in removing snap-fitted covering lens 24.

Figures 3, 4:
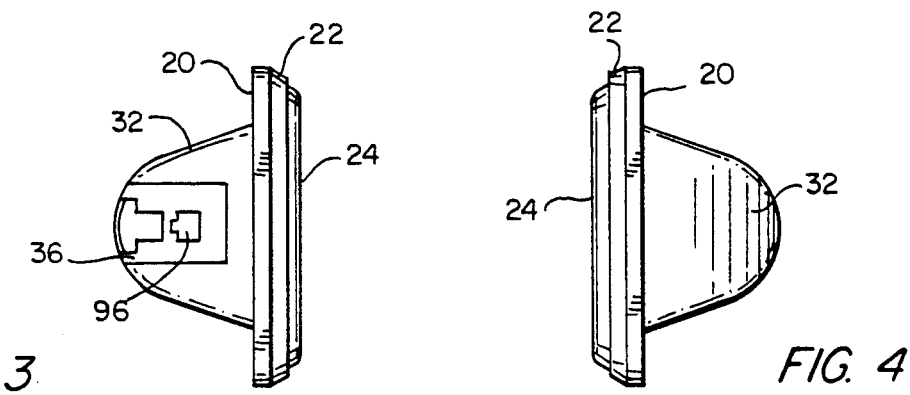
FIG. 3 is a right end elevation.
FIG. 4 is a left end elevation.

In FIG. 3, plug insert 36 is shown as seated within well 32 such that the wiring aperture 96 is apparent. As shown both in FIGS. 3 and 4, covering lens 24 and peripheral ledge 22 may be complementally inclined so as to present a complementally tapered exterior edge 64 for the dome light housing.

Figure 5:
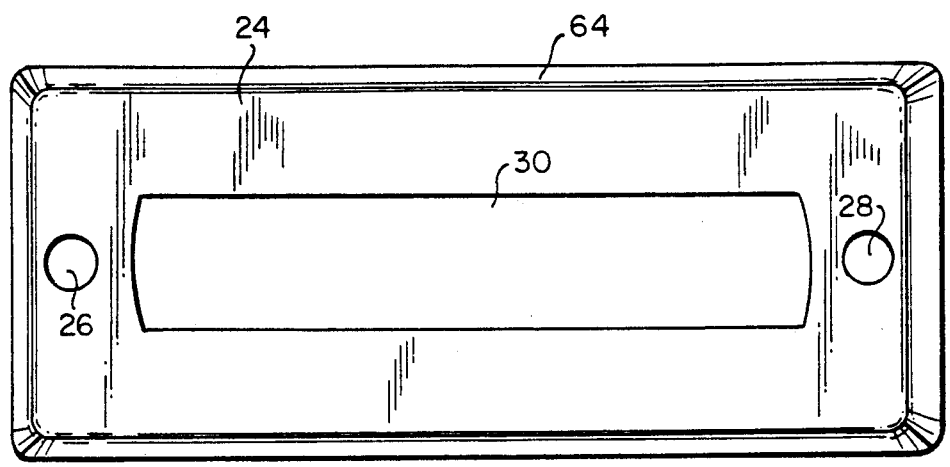

In FIG. 5, covering lens 24 is shown, also, with tapered edge 64 and end apertures 26, 28 for tamper-proof securement of covering lens 24 to the housing.

Figure 6:
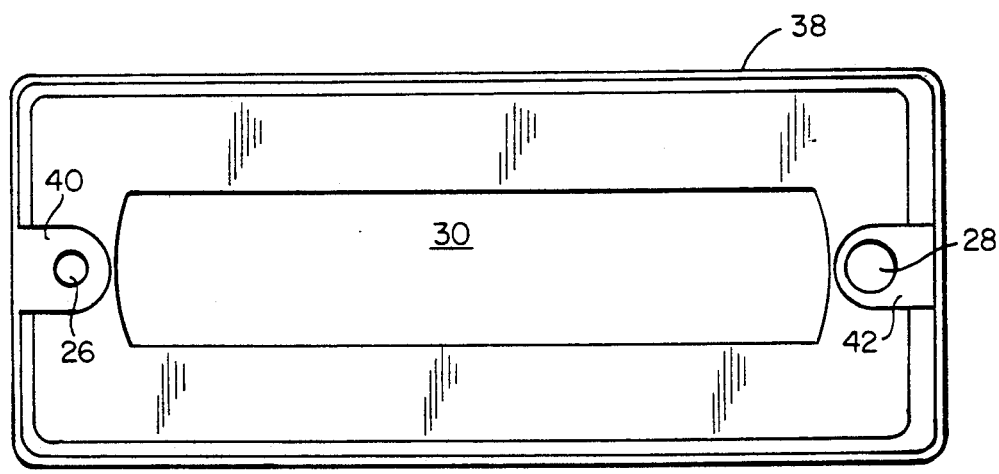
FIG. 6 is a rear elevation of covering lens 24.

As illustrated in FIG. 6, apertures 26, 28 are shown as further defined by inwardly extending bosses 40, 42 molded within covering lens 24.

Figure 7:
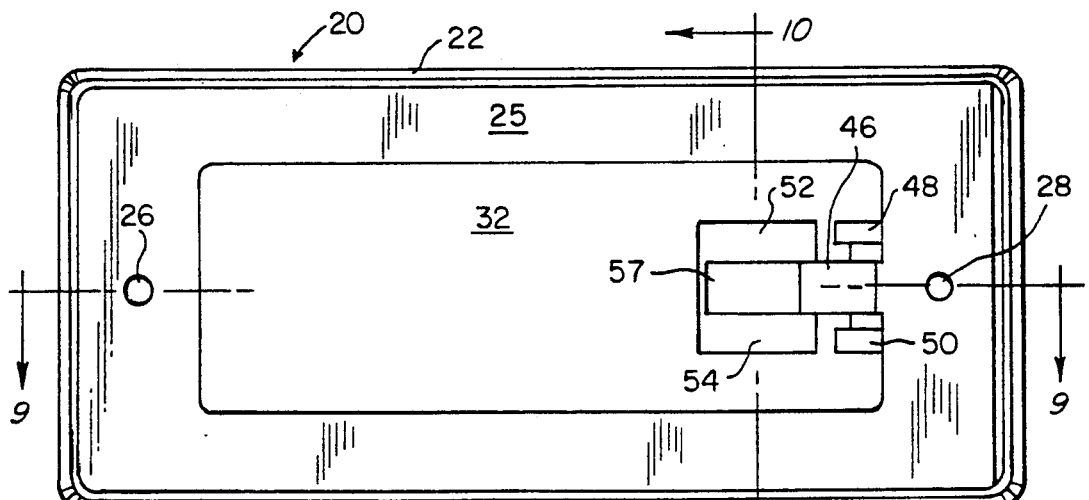
FIG. 7 is a front elevation of the dome light housing with the lens removed and showing at the right or end with aperture seat for the plug insert.
Figure 8:
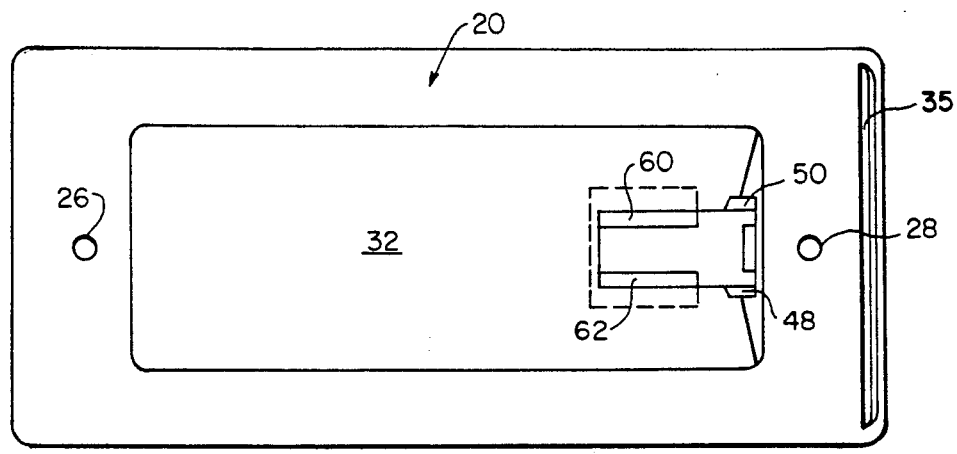
FIG. 8 is a rear elevation showing the plug insert in place.
Figure 9:
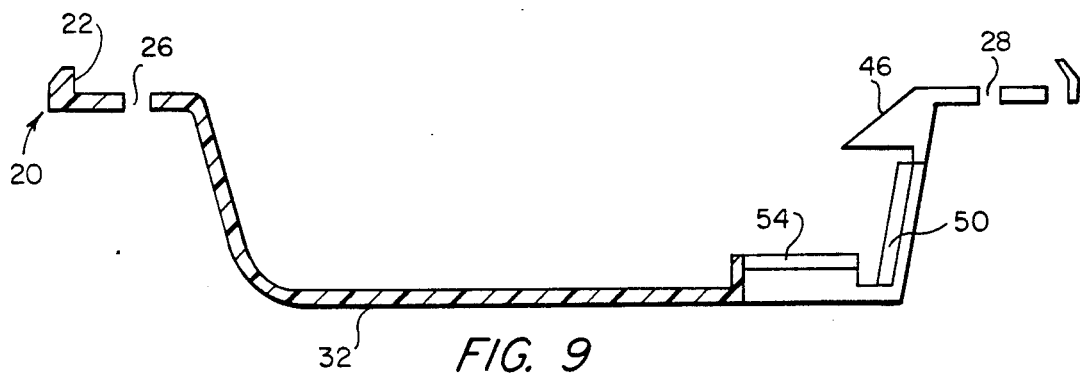
FIG. 9 is a longitudinal section of the housing and well.
Figures 10, 12:
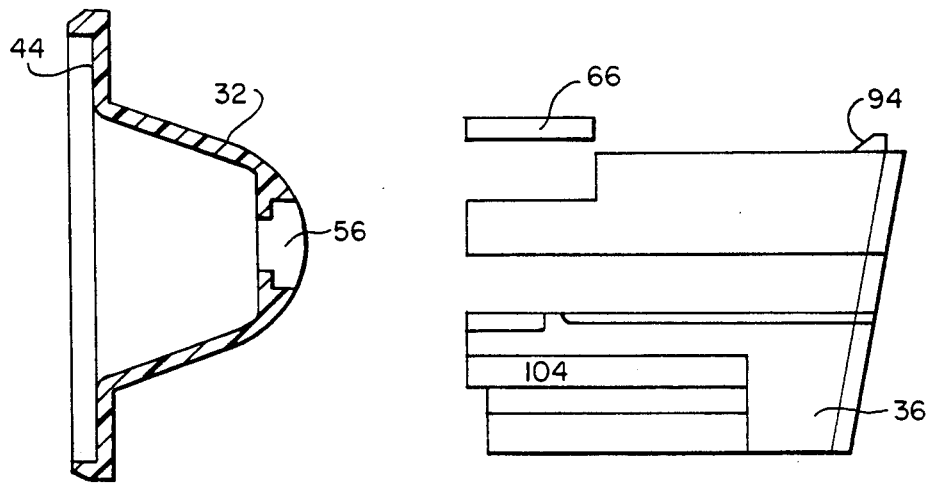
FIG. 10 is a transverse section, showing the housing defining a well with a peripheral ledge and support surface extending around the open top of the housing.
FIG. 12 is a side elevation of the plug insert.

In FIG. 7, there is illustrated well 32 having an open top with an enclosed bottom, an enclosed end and an end with aperture. Plug insert aperture 57 may be defined in the bottom and end with aperture of well 32 for complemental fitting with plug insert 36. Adjacent horizontal support ledges 52, 54 are molded in the bottom of well 32. Molded in the top of well 32 is an inclined planar surface 46 which serves as a seat for resilient clip 70, illustrated in FIG. 11. Vertically extending ribs 48, 50 are molded at the end with aperture of well 32 for complemental abutment with plug insert 36 lateral ribs 98, 100.

As illustrated in FIG. 7, lens support surface 25 is defined as a flat surface extending inwardly of peripheral ledge 22.

In FIG. 11, inclined planar surface 46 is shown as extending inwardly of well 32 and above downwardly extending lower lip 92. Adjacent horizontal support ledges 52, 54 extend from wall 106 outwardly towards wiring aperture 96.

Plug insert 36 may include on its forward end side protrusions 104, 108, and bottom protrusion 60, 62 which abut horizontal support ledges 52, 54 of the bottom of well 32 as at 88. A curvate lower surface 102 is coincident with the curvate inner surface 86 of well 32, as plug insert 36 is fitted into place. Plug insert 36 rear or outer end may include upwardly extending spur 94 which engages and locks against planar surface 46, lower lip 92, as plug insert 36 is fitted in place within well 32.

As illustrated in FIGS. 11 and 13, resilient clip 70 may be secured at its anterior end 72 so as to be aligned with aperture 28. Resilient clip 70 includes downwardly inclined mid-portion 74 resting upon inclined planar surface 46, such that the interior clip end downwardly extending sides 76 engage wired end 80 of illuminating bulb 78. Simultaneously, electrical wire assembly 34 is secured within resilient clip 70, such that electrical wire connector 82 vertical sides 84 engage the adjacent portion of wired end 80 of illuminating bulb 78. Manifestly, the bulb assembly is grounded through inserting of a conventional set screw, or the like, through aperture 28 defined in covering lens 24, housing 20 and clip end 72.

In FIG. 14, plug insert 36 is shown as having upper shoulders 66, 68 defining upon horizontal slot 65, and wiring aperture 96 for supporting electrical wire connector 82 and wiring 34, and forward end side protrusions 104, 108 and bottom protrusion 60, 62 which abut adjacent horizontal ledges 52, 54.

Conventional dome light requires two steps for installation within a school bus. First, the installer picks up the light housing and attaches the light housing to the bus roof with one or more screws extending through aligned holes to engage the school bus ceiling. Then, the installer then picks up a covering lens and separately attaches the lens by securing two screws through the lens and into the housing.

Applicants' dome light housing is delivered as a unitary housing and requires only two set screws both for securing the covering lens and attaching the lens to the school bus ceiling, while grounding the assembly to the school bus.

As will be apparent, applicants' dome light is assembled by:
1. Snapping dome light plug insert 36 into the dome light housing;
2. Inserting the dome light "ground strap" resilient clip 70;
3. Inserting electrical wire connector 82 within resilient clip 70;
4. Inserting illuminating bulb 78;
5. Snapping covering lens 24 within the housing peripheral ledge 22.

When covering lens 24 is mounted, one screw goes through the covering lens and contacts resilient clip 70 while the screw at the other ends holds covering lens 24 firmly in place. Lens 24 is thus held in place by a single screw and the peripheral ledge 22.

Manifestly, a lens which might be held in place only by snapping over a housing could not survive the prying hands of little children. Applicants' lens 24 on the other hand, cannot be pried off. Manifestly, resilient clips could be replaced by an additional ground for buses which have plastic interior ceilings.

We claim:

1. A dome light housing adapted for fitting within a vehicle interior, comprising:
   a) a unitary housing adapted for supporting a bulb assembly and a covering lens, said unitary housing further including:
      i) a base defining a well having an enclosed bottom, an enclosed end, an end with aperture and an open top for enclosing the bulb assembly;
      ii) a covering lens support surface with peripheral ledge extending around the open top of said well as a seat for a covering lens, and
      iii) a seat for a plug insert defined at said end with aperture, said seat including an aperture and adjacent structures for complemental fitting and support of a plug insert within the well, said adjacent structures including a pair of adjacent horizontal ledges defined at said enclosed bottom of said well as a support for a plug insert;
      iv) an inclined planar surface extending from the covering lens support surface inwardly into said well and above said seat for a plug insert as a support for an illuminating a bulb which connected to one end of a resilient clip and connecting at its other end to a wiring assembly and including a downwardly extending locking spur which engages with an upwardly extending spur of the plug insert;
   b) a covering lens removably supported upon said covering lens support surface and engaging at its periphery with said peripheral ledge, and
   c) a plug insert supporting said wiring assembly, said plug insert being complementally fitted within said seat for plug insert and said end with aperture, such that said illuminating bulb is presented within said well and adjacent said covering lens, said wiring assembly extends from said resilient clip and through an aperture defined in said plug insert and outwardly of said housing.

2. A dome light housing as in claim 1, said peripheral ledge and the periphery of said covering lens being inclined complementally to define a smooth exterior edge for said dome light housing.

3. A dome light housing as in claim 2, including a resilient clip seated upon said inclined planar surface and extending at its other end inwardly of said well, so as to support said illuminating bulb and wiring assembly in operable contact adjacent said covering lens.

* * * * *